United States Patent
Jouppi et al.

(10) Patent No.: US 6,204,859 B1
(45) Date of Patent: *Mar. 20, 2001

(54) METHOD AND APPARATUS FOR COMPOSITING COLORS OF IMAGES WITH MEMORY CONSTRAINTS FOR STORING PIXEL DATA

(75) Inventors: Norman P. Jouppi, Palo Alto, CA (US); Joel J. McCormack, Boulder, CO (US); Chun-Fa Chang, Durham, NC (US)

(73) Assignee: Digital Equipment Corporation, Maynard, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,557

(22) Filed: Oct. 15, 1997

(51) Int. Cl.$^7$ .................................................. G06T 11/40

(52) U.S. Cl. ........................... 345/431; 345/428; 345/422

(58) Field of Search ................................ 345/428, 421, 345/422, 431, 432, 153

(56) References Cited

U.S. PATENT DOCUMENTS

| 5,301,038 | 4/1994 | Todd | 358/455 |
|---|---|---|---|
| 5,432,898 | 7/1995 | Curb et al. | 395/143 |
| 5,481,669 | 1/1996 | Poulton et al. | 395/164 |
| 5,581,680 | 12/1996 | Sfarti et al. | 395/143 |
| 5,668,999 | 9/1997 | Gosling | 395/704 |
| 5,852,443 | * 12/1998 | Kenworthy | 345/431 |
| 5,854,631 | * 12/1998 | Akeley et al. | 345/419 |
| 5,864,342 | * 1/1999 | Kajiya et al. | 345/418 |
| 5,929,862 | * 7/1999 | Barkans | 345/431 |

FOREIGN PATENT DOCUMENTS 2 278 524  3/1994 (GB).

OTHER PUBLICATIONS

Akeley, K., "RealityEngine Graphics," Computer Graphics Proceedings, Annual Conference Series, 1993.
Carpenter, L., "The A–buffer, an Antialiased Hidden Surface Mehtod," Computer Graphics, vol. 18, No. 3, Jul. 1984.
Torborg et al., "Talisman: Commodity Realtime 3D Graphics for the PC," Computer Graphics Proceedings, Annual Conference Series, 1996.
Winner et al., "Hardware Accelerated Rendering Of Antialiasing Using A Modified A–buffer Algorithm," Computer Graphics Proceedings, Annual Conference Series, 1997.

* cited by examiner

Primary Examiner—Mark R. Powell
Assistant Examiner—Motilewa Good-Johnson
(74) Attorney, Agent, or Firm—Pennie & Edmonds LLP

(57) ABSTRACT

A method and an apparatus determine a color for pixels in a graphics system in which images are defined by pixels. Multiple fragments of an image may be visible in any given pixel. Each visible fragment has a fragment value that includes the color of that fragment. For such given pixel, up to a predetermined number of the fragment values are stored. When a new fragment is visible in the given pixel, one of the fragment values is discarded to determine which fragment values are stored and subsequently used to generate the color of the pixel. The discarded fragment value may be the new fragment value or one of the stored fragment values. Various strategies can be used to determine which fragment value is discarded. One such scheme selects the stored fragment value with the greatest Z-depth. Another scheme selects the stored fragment value that produces the smallest color difference from the new fragment value. Still another scheme selects the new fragment value when one of the fragments is in front of the new fragment and the stored fragment value of that fragment produces the smallest color difference from the new fragment value.

29 Claims, 12 Drawing Sheets

METHOD AND APPARATUS FOR COMPOSITING COLORS OF IMAGES WITH MEMORY CONSTRAINTS FOR STORING PIXEL DATA

FIELD OF THE INVENTION

This invention relates generally to computer graphics, and more particularly to a method and apparatus for producing composite colors images defined by subpixel resolution.

BACKGROUND

Many computer graphics systems use pixels to define images. The pixels are arranged on a display screen as an rectangular array of points. Aliasing occurs because the pixels have a discrete nature. Artifacts can appear when an entire pixel is given a light intensity or color based upon an insufficient sample of points within that pixel. To reduce aliasing effects in images, the pixels can be sampled at subpixel locations within the pixel. Each of the subpixel sample locations contributes color data that can be used to generate the composite color of that pixel. However, some graphics systems may limit the amount of memory for storing subsample color data for each pixel. Thus, such graphic systems must carefully select which color data are stored so that these systems can still accurately produce a composite color for each pixel.

Hence, there is a need for a method and an apparatus that, for each pixel, can make color selections and replacements without introducing unsatisfactory artifacts into a displayed image.

SUMMARY OF THE INVENTION

In accordance to the present invention, an objective is to provide an apparatus and method for determining colors of pixels. Another objective is to operate effectively within memory constraints for storing pixel data by selecting the fragment data that contributes to the color of a given pixel, which can be from fragments of different objects or surfaces of the image, while minimizing noticeable color differences for the pixel and avoiding the introduction of unsatisfactory artifacts.

The present invention resides in a method and an apparatus for determining a color of a pixel. In terms of the method, the invention stores up to a predetermined number of fragment values for the pixel. Each stored fragment value is associated with a fragment of an image that is visible in that pixel. A new fragment is determined to be visible in the pixel with at least one other fragment with a stored fragment value still being visible in the pixel. The fragment value of one of the visible fragments is discarded to determine which fragment values are stored and subsequently used to generate the color of the pixel.

In one aspect of the method, the discarded fragment value is the new fragment value of the new fragment. In another aspect, the discarded fragment value is one of the stored fragment values.

In yet another aspect, the new fragment is part of a different surface of the image than each of the fragments associated with a stored fragment value.

In still another aspect, the method selects for discarding the stored fragment value with the Z-depth value that is larger than the Z-depth value of each other stored fragment value, and replaces that fragment value with the new fragment value. The greater the Z-depth value, the farther the associated fragment is from the viewer of the image.

In still yet another aspect, the method selects for discarding the stored fragment value with the color value that produces a numerically smaller color difference than the color value of each other stored fragment value when compared to the color value of the new fragment value. Discarding the fragment value that produces the smallest color difference minimizes any noticeable color change for the pixel.

In still another aspect, the two above aspects of the method can be used to discard the new fragment.

In terms of the apparatus, the invention comprises a memory and a graphics device. The memory stores up to a predetermined number of fragment values for a given pixel. Each stored fragment value is associated with a fragment of an image that is visible in that pixel. The graphics device determines that a new fragment is visible in the pixel with at least one other fragment with a stored fragment value still being visible in the pixel. The graphics device discards the fragment value of one of the visible fragments to determine which fragment values can be used to generate the color of the pixel.

BRIEF DESCRIPTION OF THE DRAWINGS

An embodiment of the invention will be described with reference to the accompanying drawings, in which.

DETAILED DESCRIPTION OF A PREFERRED EMBODIMENT

System Overview

Figure 1:
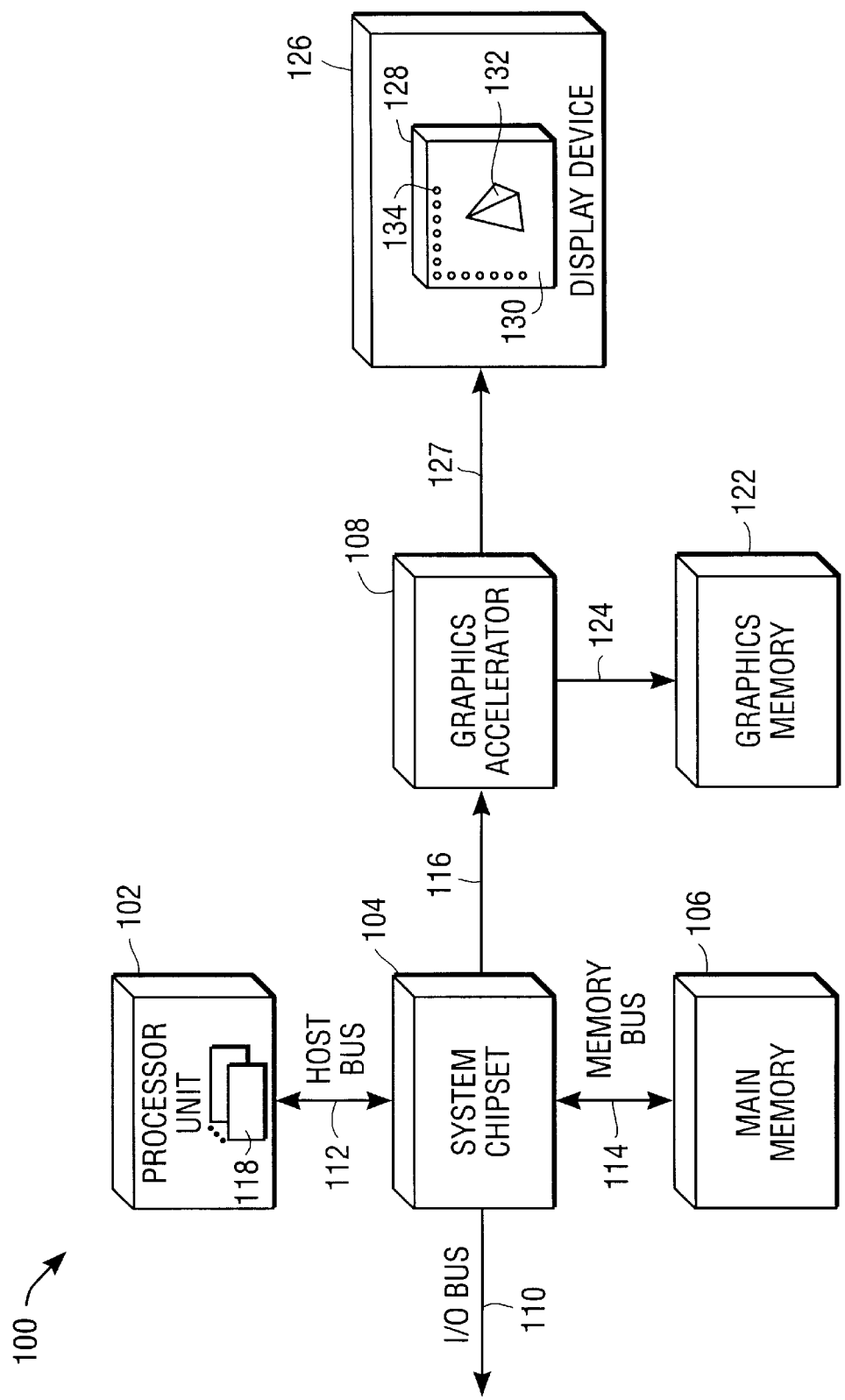
FIG. 1 is a block diagram of an exemplary computer graphics system that can be used to practice the invention.

FIG. 1 shows a computer system 100 that can generate monochrome or multicolor 2-dimensional (2D) and 3-dimensional (3D) graphic images for display according to the principles of the present invention. The computer system 100 can be one of a variety of raster graphics systems including, for example, a personal computer, a workstation, or a mainframe.

In the computer system 100, a system chipset 104 provides an interface among a processing unit 102, a main memory 106, a graphics accelerator 108 and devices (not shown) on an I/O bus 110. The processing unit 102 is coupled to the system chipset 104 by the host bus 112 and includes a central processing unit (CPU) 118. The main memory 106 interfaces to the system chipset 104 by bus 114.

The graphics accelerator 108 is coupled to the system chipset 104 by a bus 116, by which the graphics accelerator 108 can receive graphics commands to render graphical images. A graphics memory 122 and a display device 126 are coupled to the graphics accelerator 108; the graphics memory 122 is coupled by bus 124, and the display device 126, by bus 127. The display device 126 includes a cathode ray tube (CRT) raster display monitor 128 with a display surface or screen 130. The CRT 128 produces color images, but the invention can also be practiced with a monochrome monitor to display gray-scale images or with printers that prints black and white or color images.

An image 132 appears on the display screen 130 by illuminating a particular pattern of individual points called pixels 134. The image 132, for example, can be 2D alphanumeric characters or a 3D scene filled with objects. The display screen 130 includes a two-dimensional array of such pixels 134. The array size of display screens 130 can vary widely. Examples of display screen 130 sizes include 1024×768 and 1920×1200 pixels. For the purposes of practicing the invention, the display device 126 may be any other pixel-based display such as a liquid-crystal display or a dot matrix printer.

The graphics memory 122 includes storage elements for storing an encoded version of the graphical image 132. There is a direct correspondence between the storage elements and each pixel 134 on the display screen 130. The storage elements are allocated to store data representing each pixel 134, hereafter referred to as pixel data. For example, five bytes may be used to encode a color representation for each pixel.

The values stored in the storage elements for a particular pixel controls the color of the particular pixel 134 on the screen 130. By "color", it is to be understood that the brightness or intensity of the pixel 134 is also intended. Pixel data can translate directly into colors or into indices to access a color lookup table.

During operation, the computer system 100 can issue graphics commands that request an object to be displayed. The graphics accelerator 108 executes the graphics commands, converting the object into primitives and then into fragments. A primitive is a graphical structure, such as a line, a triangle, a circle, or a surface patch of a solid shape, which can be used to build more complex structures. A fragment is a 2D polygon created by clipping a primitive of the image 132, such as a line, triangle, or circle, to the boundaries of the pixel 134. A more detailed description of fragments is provided by Loren Carpenter in "The A-buffer, an Antialiased Hidden Surface Method", Computer Graphics Vol. 18, No. 3, 1984, pp. 103–107, incorporated by reference herein. There, techniques merge fragments into a fragment list when the fragments are from the same object or surface of the image. Here, the fragments that are combined to produce the color of a pixel can have a different relationship to each other: that is, the fragments can be from different objects or surfaces of the image 132.

The graphics accelerator 108 renders the fragments, and loads the pixel data corresponding to the fragments into the appropriate storage elements of the graphics memory 122. The pixel data can be transferred into the graphics memory 122 from the main memory 106 via busses 112, 114, 116, and 124, or written directly into the graphics memory 122 by the graphics accelerator 108.

To display the image 132, the CRT monitor 128 projects a beam onto the screen 130. In synchrony, the pixel data are read out of the graphics memory 122 as the beam scans the screen 130. The CRT monitor 128 renders the pixel data as illuminated points of color on the display screen 130.

Figure 2A:
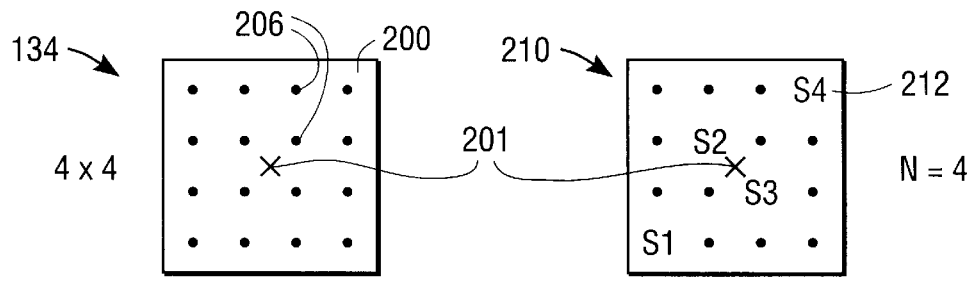
FIGS. 2A–2C represent various subdivisions of a pixel into subpixels, and illustrate exemplary sparse supersampling patterns that can be used to sample the subpixels.
Figure 2B:
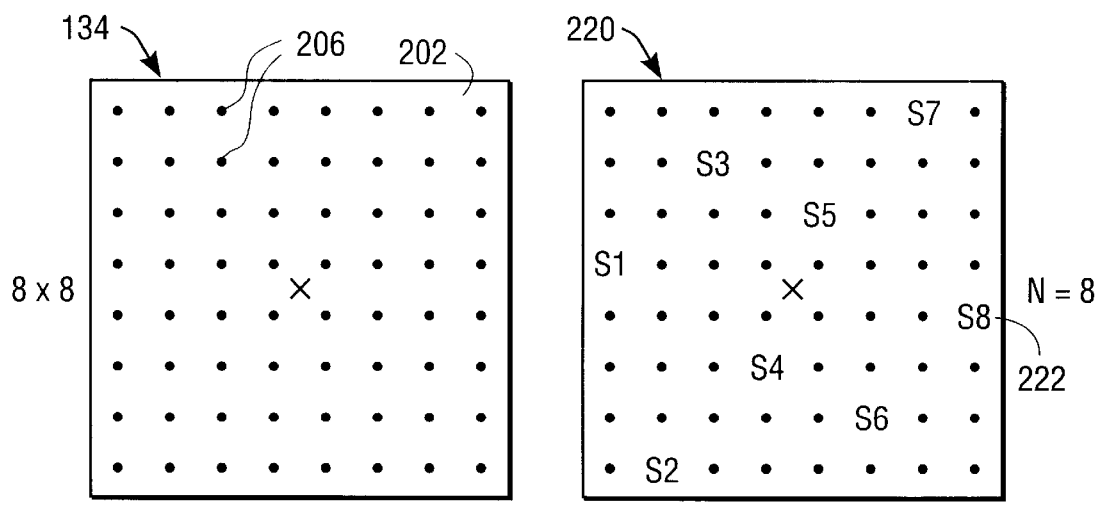
Figure 2C:
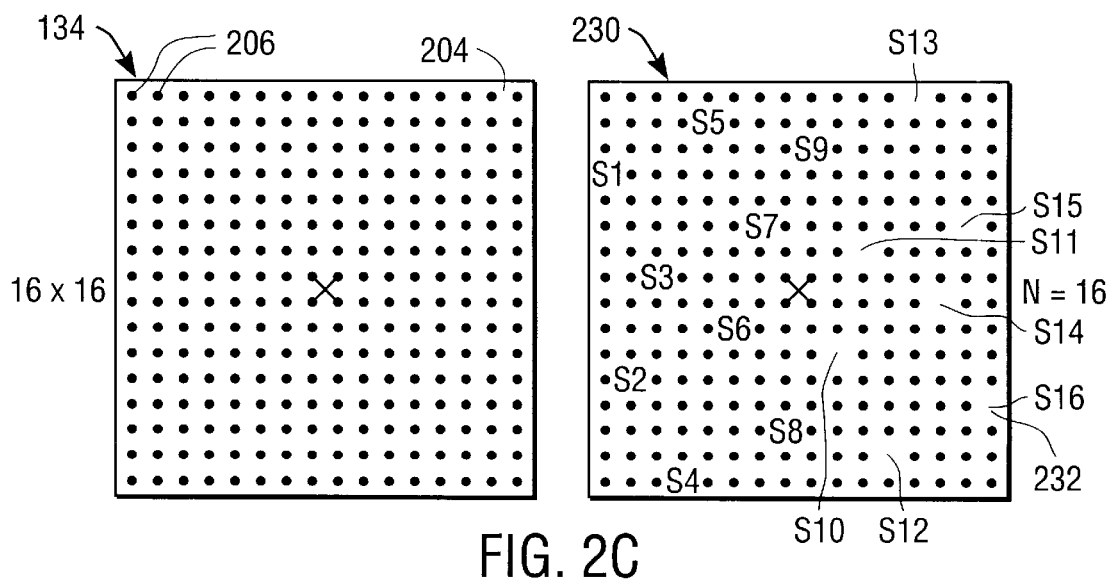

FIGS. 2A–2C illustrate various exemplary subdivisions of a pixel 134. FIG. 2A shows pixel 134 divided into a 4×4 array 200 of evenly spaced points called subpixels 206; FIG. 2B shows an 8×8 array 202 of subpixels 206; and FIG. 2C shows a 16×16 array 204. Dividing a pixel 134 into subpixels 206 provides multiple points at which the image 132 covering that pixel 134 can be sampled. For reference, the center 201 of the pixel 134 is shown as an X.

Generally, the more subpixels 206 there are in the array, the greater the resolution of the pixel 134. Thus, the displayed color of the pixel 134 does not rely entirely on one sample point, but upon several subpixel samples 206. Methods for calculating a pixel value from multiple sample points are well known in the art.

Known implementations sampled at every subpixel 206 in a pixel 134. While, theoretically, such full scene supersampling presented opportunities for attaining high resolution, the technique unnecessarily consumed memory resources. Each sampled subpixel 206 required memory resources to store and use the sampled data. Thus, fully sampling the 4×4 array 200 of subpixels 206 required memory storage for sixteen samples, in addition to the typical memory requirements for each pixel 134. If the sixteen samples each required, for example, eight bytes of storage, then implementing full scene supersampling could require an additional 295 MBytes of memory for a 1920×1200 pixel display screen 130. The 16×16 array 204, which requires storage for 256 samples, needs sixteen times as much memory.

Accordingly, recent modern implementations do not sample at every subpixel 206. Rather, those subpixels 206 which are sampled are sparsely distributed in the subpixel array. In general, the antialiasing results were almost as effective for such sparse supersampling as for the full scene supersampling technique.

FIGS. 2A–2C each illustrate an exemplary sparse supersampling pattern 210, 220, 230 that can be used to sample the subpixels 206 of the corresponding subpixel array. The illustrated exemplary sample patterns 210, 220, 230 each have N samples distributed uniformly throughout an N×N subpixel array with exactly one subpixel sample in any particular row and in any particular column.

The sampling pattern 210 has four subpixels samples S1–S4 (N equals 4). For sampling pattern 220, N equals 8, and the eight subpixel samples 222 are S1–S8. For sampling pattern 230, N equals 16, and the sixteen subpixel samples 232 are S1–S16. The sampling pattern 210, 220, 230 can be repeated for every pixel 134 on the display screen 130. Various other sampling patterns can be used to practice the principles of the invention.

Although sparse supersampling uses less memory than full scene supersampling, considerable amounts of additional memory are still required. For example, when N equals 4, a 1920×1200 pixel screen 130 still needs eight bytes storage for each of four subpixel samples. This requires an additional 74 Mbytes of pixel data. The requirements are doubled and quadrupled when N equals 8 and 16, respectively.

The principles of the present invention can reduce the storage requirements even more than such sparse supersampling without reducing the number of subpixel samples for an N×N subpixel array. The invention relies upon the observation that typically only a few fragments of the image 132 are visible within a given pixel.

For static and animated images, the antialiasing effects achieved by eight sparse supersamples in the 8×8 array 202 appear significantly better than for four samples in the 4×4 array 200. But differences between sixteen samples in the 16×16 array 204 and eight samples in the 8×8 array 202 may be indistinguishable.

Figure 3:
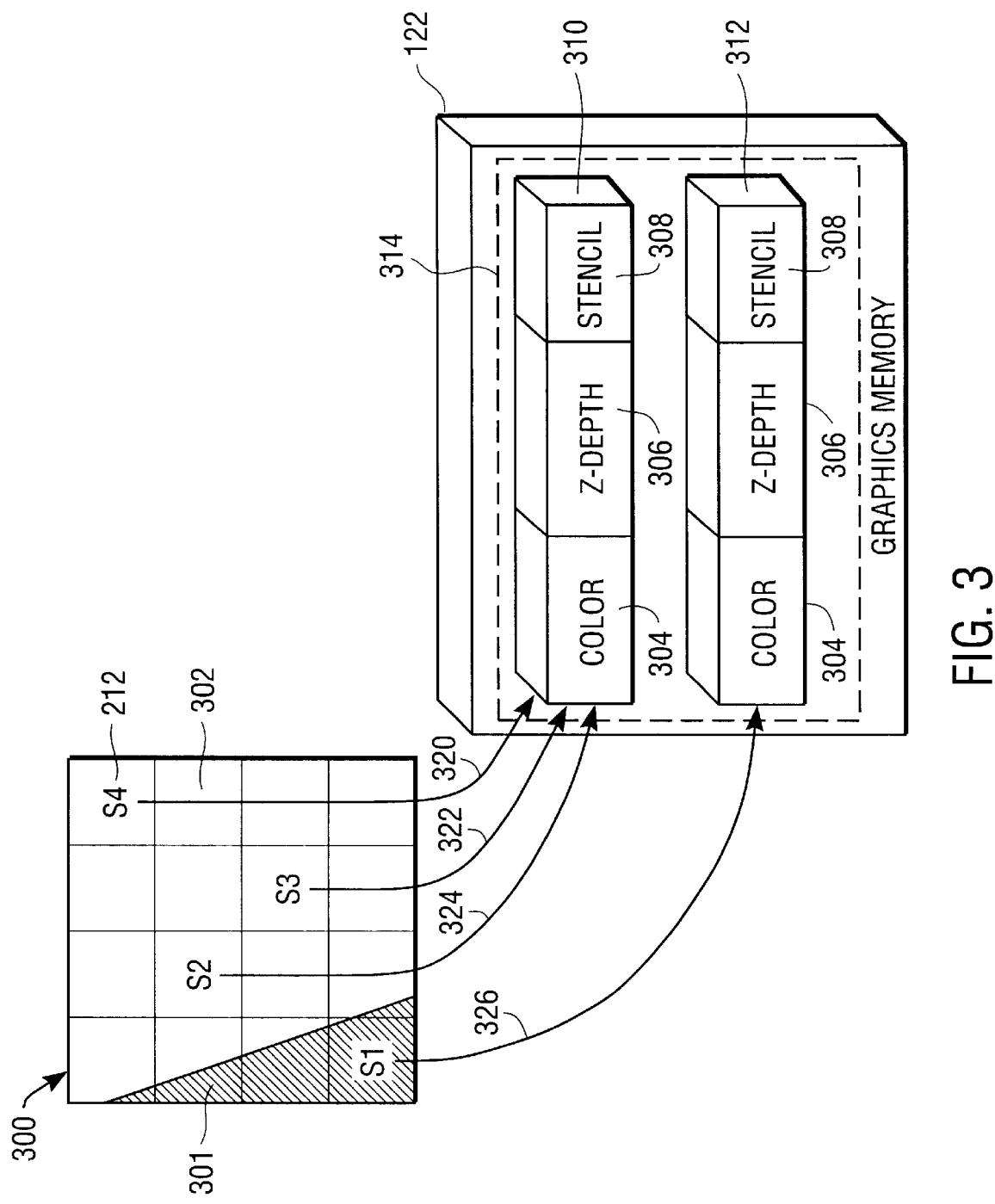
FIG. 3 represents an exemplary linking of subpixel samples in one of the supersampling patterns of FIGS. 2A–2C to two fragment triples stored in a pixel memory.

FIG. 3 shows an exemplary pixel 300 that is part of the image 132 and is subdivided into a 4×4 subpixel array 200. The pixel 300 has four sampling positions according to sampling pattern 210 of FIG. 2A. Two fragments 301, 302 are in pixel 300. Each fragment 301, 302 is associated with a fragment value, called a fragment triple 310, 312. For example, in FIG. 3, fragment triple 310 is associated with fragment 302, and fragment triple 312 with fragment 301.

Fragment values are called fragment triples because each fragment triple 310, 312 includes three values: a color value 304, a Z-depth value 306, and a stencil value 308. The color value 304 represents the color and opacity of the corresponding fragment. The Z-depth value 306 represents a Z-coordinate value of the corresponding fragment along a Z-axis that is perpendicular to the image 132 to provide 3D depth. The stencil value 308 can be used to group or identify sets of fragments of the image 132, or to logically or arithmetically process or count operations upon fragments, or for other purposes known to those skilled in the art.

In the preferred embodiment, the exemplary fragment triples 310, 312 each use five bytes to represent the color 304, three bytes for the Z-depth 306 and one byte for the stencil 308. The five color 304 bytes accommodate four 10-bit color channels: Red, Green, Blue, and Alpha.

The color of a fragment is expressed by the combination of the values stored in the Red, Green and Blue (RGB) channels. The value stored in each RGB channel indicates the intensity (or brightness) of that color channel. Low values correspond to low intensity, dark colors; high values correspond to high intensity, light colors. Various methods for producing the color by combining the RGB values are well known in the art.

The opacity of the fragment is expressed by the value stored in the Alpha channel. For example, a 1.0 value (i.e., all 10 Alpha-channel bits are 1) indicates that the associated fragment is opaque, a 0.0 value indicates that the fragment is invisible, i.e., completely transparent, and values between 0.0 and 1.0 indicate degrees of transparency.

Memory is allocated to each pixel 134 for storing a predetermined number of fragment triples. This memory can be either graphics memory 122, as shown in FIG. 3, or main memory 106. In the example shown in FIG. 3, the pixel memory 314 is allocated for one particular pixel 300. Conceivably, a group of pixels, like a 2×2 array of pixels 134, can share a particular pixel memory 314. Any fragment triples stored in the pixel memory 314 would be used by each pixel 134 in the group, rather than by only one particular pixel 300. This can save more memory than storing a predetermined number of fragments for every pixel 134, particularly for portions of the image 132 that change color and Z-depth gradually.

Alternatively, memory for storing fragment triples can be dynamically allocated to each pixel 134 rather than fixed to a predetermined number. Here, a variable number of fragment triples can be stored for each pixel 134, the graphics accelerator 108 allocating memory to the pixel 134 as needed, presuming there is still available pixel memory in the system 100. Another method combines aspects of both above-described methods, allocating memory to each pixel 134 for storing a predetermined number of fragment triples, and dynamically allocating additional memory to a particular pixel 134 when needed to store a fragment triple beyond the predetermined number.

The exemplary embodiment shown in FIG. 3 stores two fragment triples 310, 312 in the pixel memory 314. These fragment triples 310, 312 are associated with the fragments 301, 302 that cover the pixel 300. Before the fragments 301, 302 appear in the pixel 300, the pixel memory 314 can be initialized to contain a default fragment value. The default value represents a background fragment that can be used when no fragments cover a particular subpixel sample or when all fragments that cover the particular subpixel sample are transparent. Alternatively, this default fragment value can be stored in the graphics memory 122 where the value can be shared by multiple pixels 134. Each pixel 134 could store a special index value that pointed to the default fragment.

Other embodiments can store more than two triples in order to improve the quality of the antialiasing. Storing few triples saves memory, but can produce lesser quality antialiasing than storing many triples. For instance, it is observed that for the 8×8 subpixel array 202 and the sampling pattern 220 (N=8), storing three triples produces better antialiasing results than storing two triples.

Pointers 320–326 link the subpixel samples S1–S4 to the associated fragment triples 310, 312 stored in the pixel memory 314. By link, what is meant is a logical association between the subpixel samples S1–S4 and the fragment triples 310, 312. As examples, pointer 326 links subpixel S1 to fragment triple 312, while pointers 320–324 link subpixels S2–S4 to fragment triple 310.

Figure 6A:
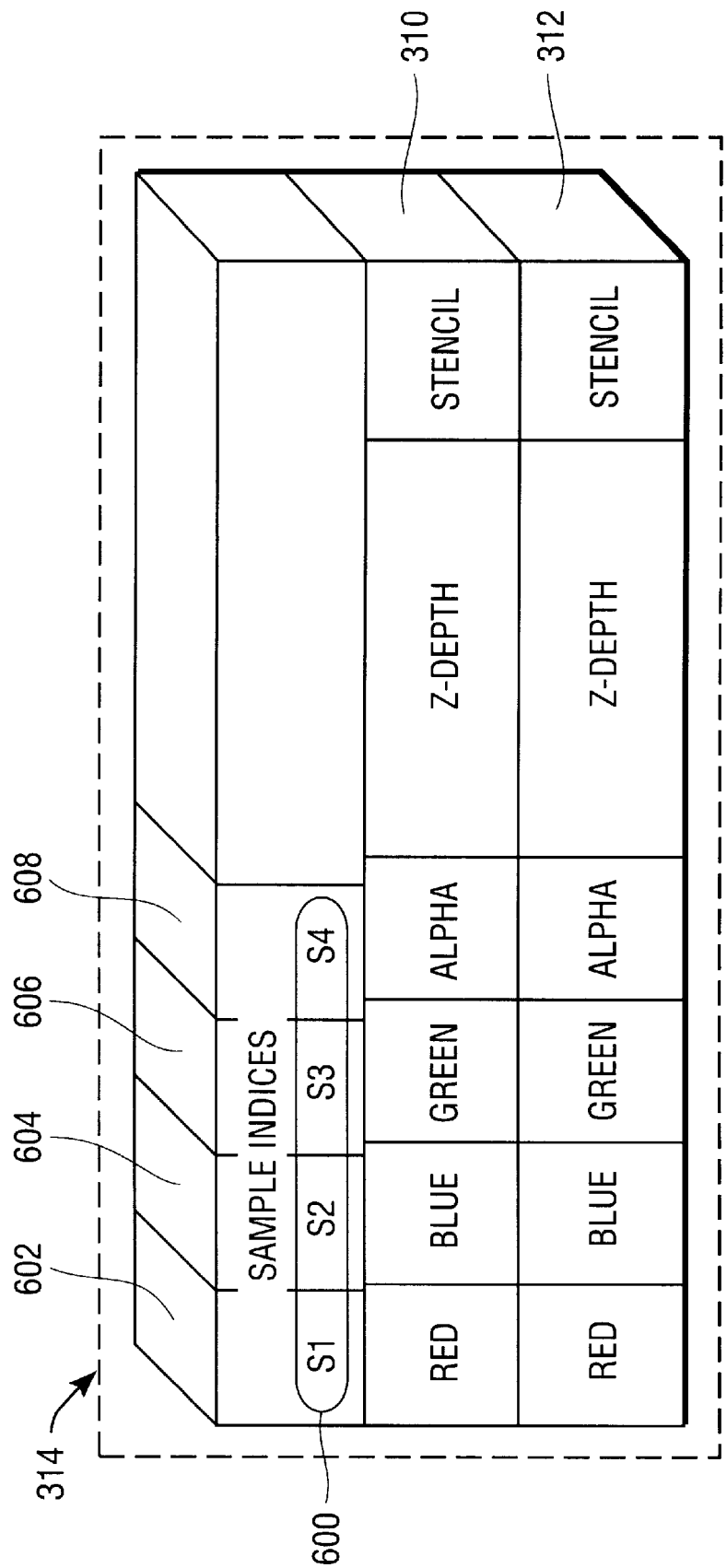
FIGS. 6A–6B illustrate a logical representation of the pixel memory including indices to the stored fragment triples.

In one embodiment, described further in connection with FIG. 6A, the linking is accomplished by storing an index value for each subpixel sample S1–S4. Accordingly, this embodiment is coined indexed sparse supersampling. In another embodiment, described in connection with FIG. 6C, the linking is accomplished by storing a coverage mask, or bit pattern, for each stored fragment value. This embodiment is hereafter referred to as an improved A-buffer technique. Collectively, the embodiments are referred to as improved supersampling techniques.

To determine the color of the exemplary pixel 300, the graphics accelerator 108 uses one of the pixel subdivisions 200, 202, 204 and a sampling pattern 210, 220, 230 to sample the portion of the image 132 covering the pixel 300. For example in FIG. 3, the graphics accelerator 108 uses the 4×4 array 200 with the N=4 sampling pattern 210 to sample pixel 300. As shown, the fragment 301 covers subpixel sample S1, and the fragment 302 covers the three subpixels samples S2–S4. A fragment covers a subpixel when the center of the subpixel sample is within an area enclosed by the fragment or, in certain cases, on an edge of the fragment.

Generally, the graphics accelerator 108 determines which fragments 301, 302 are visible at each subpixel sample S1–S4. From the perspective of a viewer of the image 132, which, for the purposes of illustrating the invention is 3D, some fragments can be closer to the viewer and in front of other fragments. The closer fragments are referred to as foreground fragments and the farther fragments, as background fragments. An opaque foreground fragment can occlude a background fragment behind that foreground fragment.

Accordingly, each fragment must pass a Z-depth test at one of the subpixel samples S1–S4, that is, the Z-value 306 of the fragment triple associated with that fragment must be smaller, i.e., closer from the perspective of the viewer, than the Z-value 306 for every other opaque fragment. If a fragment passes the Z-depth test, then the graphics accelerator 108 stores the fragment triple associated with the visible fragment in the pixel memory 314.

When the fragment 301, for example, is determined to be visible at the subpixel sample S1 of the pixel 300, the pointer 326 is generated linking that subpixel S1 to the appropriate stored fragment triple 312. In the preferred embodiment, the pointer 326 is stored in the pixel memory 314 along with the fragment triples 310, 312 associated with the pixel 300.

Rather than storing four fragment triples in the pixel memory 314, one for each of the four subpixel samples S1–S4, which would be done using typical supersampling techniques, the exemplary embodiment in FIG. 3 stores only two fragment triples 310, 312. Accordingly, the invention avoids storing redundant data for the pixel 300 because only one instance of the fragment triple 310 is stored for the three subpixel samples S2–S4. By so doing, the storage requirements for fragment triples are considerably reduced.

For example, if each fragment triple 310, 312 requires nine bytes of storage, then the improved supersampling techniques use approximately eighteen bytes of memory per pixel fewer than typical supersampling methods. The improved supersampling techniques do use additional memory for storing the pointers 320–326, but this amount is small when compared to the memory saved by storing only two fragment triples 310, 312 for the four subpixel samples S1–S4.

The memory savings increase when the pixel 300 is subdivided into one of the larger subpixel arrays 202, 204. With the 8×8 subpixel array 202 and the sampling pattern 220 (N equals 8), the improved supersampling techniques use fifty-four fewer bytes per pixel than typical supersampling. This is because only two of eight sampled fragment triples are stored in the pixel memory 314. For the 16×16 subpixel array 204 and the sampling pattern 230 (N equals 16), only two of sixteen sampled fragment triples are stored in the pixel memory 314, and so 112 bytes per pixel are saved. For a display screen 130 with 1920×1200 pixels, such savings amount to approximately 258 Mbytes.

The displayed color of the pixel 300 depends upon which filtering function is used to combine the fragment triples associated with the four subpixel samples S1–S4. One function is simply to average the colors of the fragment triples associated with the four subpixels samples S1–S4.

Figure 4:
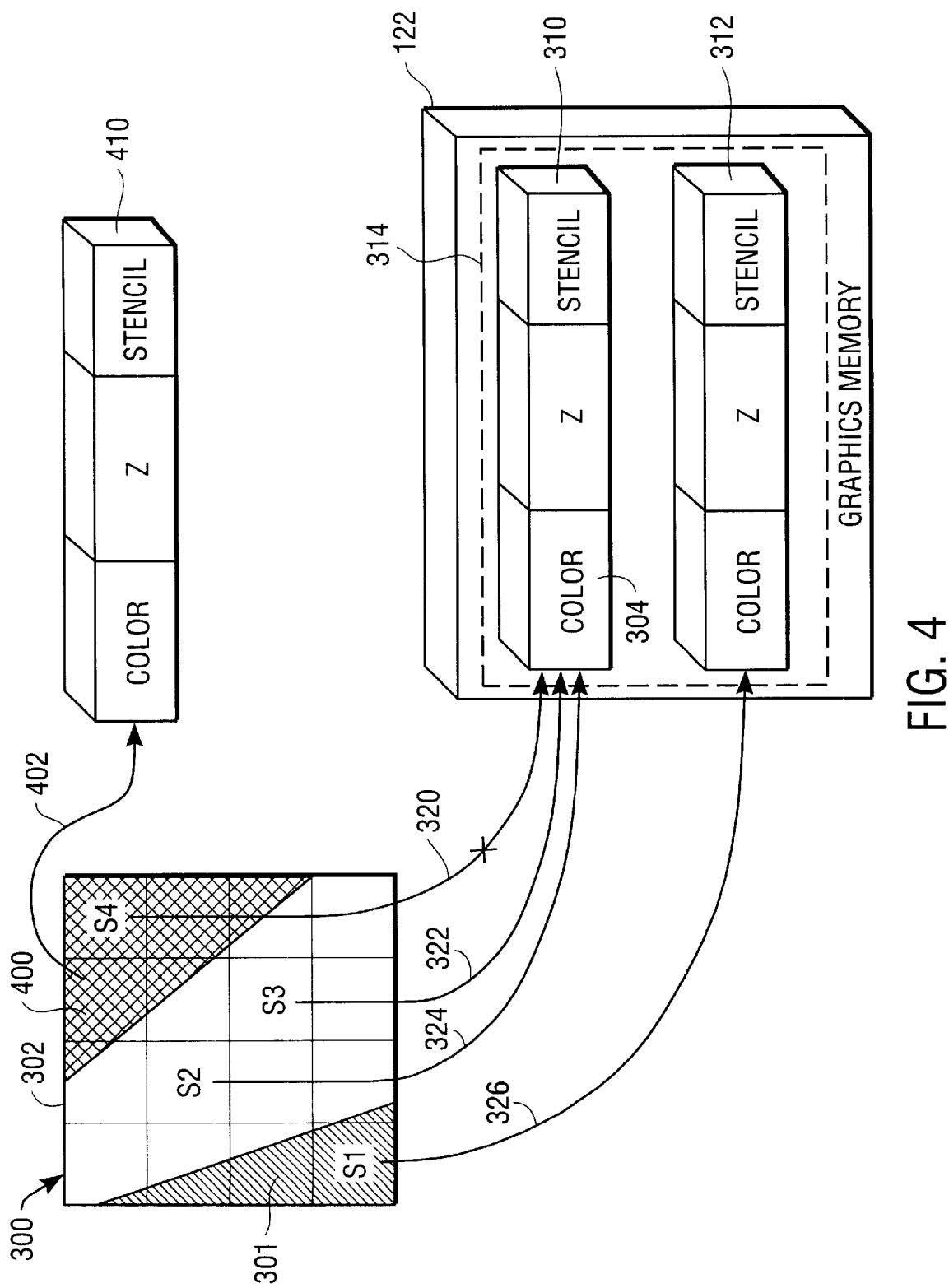
FIG. 4 represents another linking of subpixel samples for when a third fragment appears in a pixel.

FIG. 4 illustrates an exemplary case in which a third visible fragment 400 appears in the pixel 300 of FIG. 3. As indicated by an arrow 402, the third fragment 400 is linked to a new fragment triple 410. The new fragment triple 410 is different from the stored fragment triples 310, 312.

In this example, the third fragment 400 occludes a portion of fragment 302 and is visible at subpixel sample S4. The fragment 301 is still visible at the subpixel S1, as is fragment 302 at the subpixels S2–S3. Accordingly, the subpixel sample S1 remains linked to the fragment triple 312 by the pointer 326. Subpixels S2 and S3 remain linked to the fragment triple 310 by the pointer 324 and pointer 322, respectively. To illustrate that the fragment 302 is no longer visible at the subpixel sample S4, the link 320 from the subpixel sample S4 to the fragment triple 310 is shown as broken.

When the third fragment 400 is processed by the graphics accelerator 108, the fragment triples 310, 312 are already stored in the pixel memory 314, and the fragment triple 410 is shown as not yet being stored in the pixel memory 314. Described below are various ways to handle the third fragment triple 410.

Figure 5A:
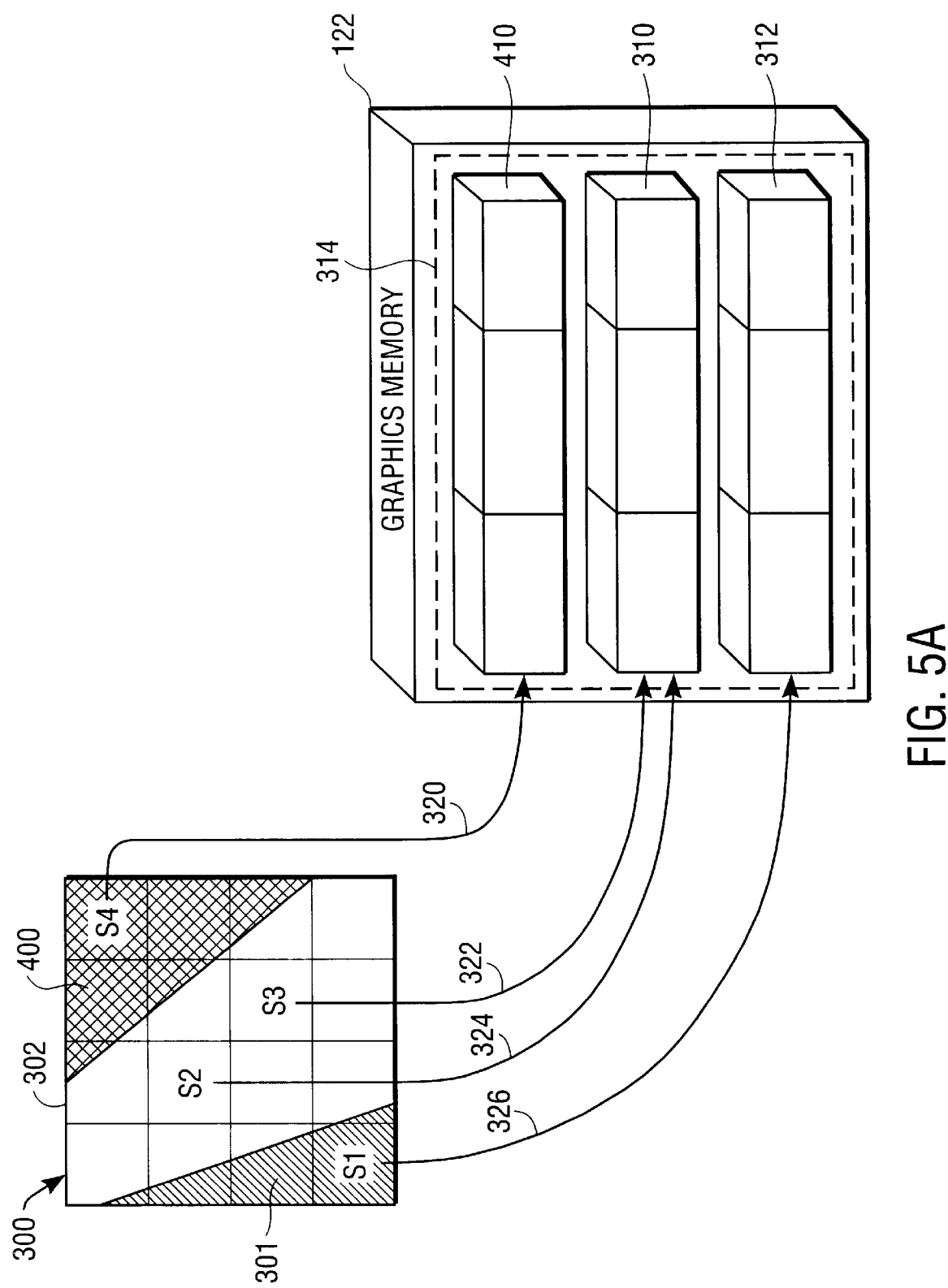
FIGS. 5A–5C illustrate alternative linkings of subpixels samples for when a third fragment appears in a pixel.

FIG. 5A shows one technique for handling the third visible fragment 400 in the pixel 300, that is, to store the corresponding fragment triple 410 in the pixel memory 314, along with the other fragment triples 310, 312. This technique presumes either that the memory 314 allocated for the predetermined number of fragment triples can accommodate the additional fragment triple 410 or that the memory 314 needed for storing the new fragment triple 410 can be dynamically allocated.

A drawback to storing additional fragment triples in the pixel memory 314 is that the amount of storage needed for the improved supersampling methods approaches or even exceeds that of typical sparse supersampling. Should a fourth fragment be visible in the pixel 300, then, in the example of the 4×4 subpixel array, the improved supersampling methods and sparse supersampling would each store four fragment triples. But for the larger subpixels arrays, such as the 8×8 array and 16×16 array, there is still a strong likelihood that there are fewer visible fragments in the pixel 300 than subpixel samples, and thus a corresponding savings of memory remains. Further, when pixel memory 314 is dynamically allocated beyond the predetermined number of fragment triples, in general, relatively few pixels will need dynamically allocated storage. Although improved supersampling methods might then require more storage for a given pixel 134 than typical sparse supersampling, the improved methods might use less storage for the entire image 132 overall.

Adaptive Process

Alternatively, an adaptive process can reduce the number of subpixel samples at which to sample the pixel 300 when the number of visible fragments in the pixel 300 exceeds the available storage for fragment triples, such as when the pixel memory 314 allocated for the predetermined number of fragment triples is already filled, or no pixel memory is available to dynamically allocate for the new fragment triple 410.

For example, if there is storage for only two fragment triples, but there are four different visible fragments in the pixel 300, a different fragment for each of the four subpixel samples S1–S4, then backing off to only two subpixel samples will ensure sufficient storage for the fragments covering those two samples.

The backing off on the number of samples can be gradual. For example, if eight subpixel samples S1–S8 are used, then the process could start with eight samples, reduce to six, then four, and eventually to two, as the number of different visible fragments appear in the pixel beyond the available storage.

The process can operate independently upon each pixel. For example, the process may use all four subpixel samples S1–S4 for one pixel, and back off to only two subpixel samples S1–S2 for another pixel.

Figure 5B:
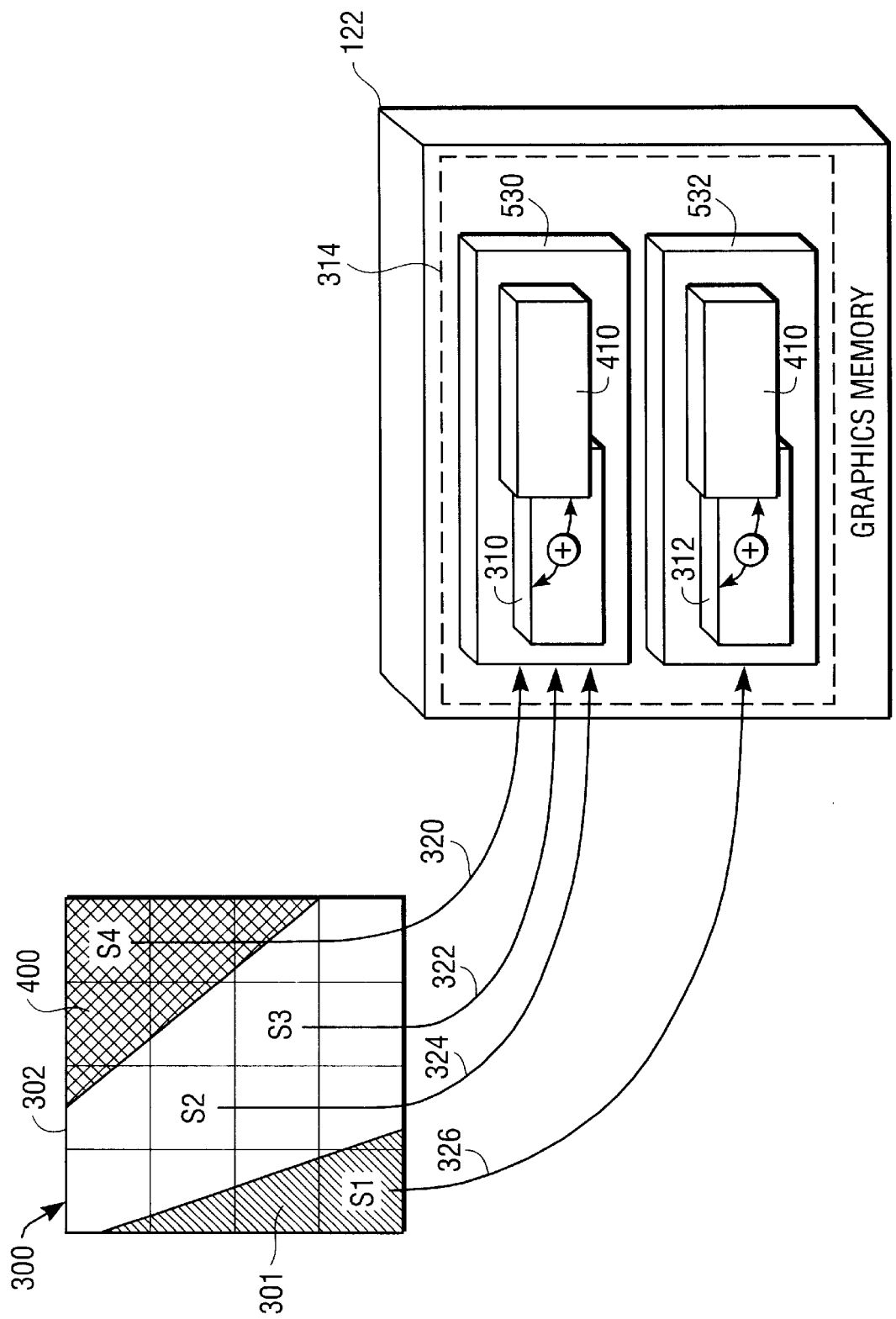

FIG. 5B illustrates still another approach for handling the third visible fragment 400 in the pixel 300, that is, to blend the corresponding fragment triple 410 with the other fragment triples 310, 312 stored in the pixel memory 314. The circled plus signs ("+") in FIG. 5B illustrate the blending process.

An exemplary blending process weights the color contribution of each fragment triple 310, 312 and the new fragment triple 410 to the blended fragment triple 530, 532.

For example, the color contribution of each stored fragment triple 310, 312 is determined by multiplying the color value 304 of that fragment triple by the number of samples still covered by that fragment triple; then by dividing the result by the number of samples S1–S4 previously covered by that fragment triple before the new fragment 400 appeared. The color contribution of the new fragment triple 410 is obtained by multiplying the color value 304 of the new fragment triple 410 by the number of samples covered by the stored fragment triple, but now covered by the new fragment 400; then by dividing the result by the number of samples S1–S4 previously covered by the stored fragment triple 310, 312 before the new fragment 400 appeared.

Here, the fragment triple 310 would contribute 2/3 of its color value 304 to the blended fragment triple 530, and the new fragment triple 410 would contribute 1/3 of its color value 304. For the blended fragment triple 532, the fragment triple 312 contribute all of its color value (1/1), and the new fragment triple 410, which covers no sample points associated with the fragment triple 312, would contribute none of its color value (0/1). Then, these weighted color values 304 are added. Other color blending techniques that are known in the art can be used.

In FIG. 5B, the fragment triple 410 is blended with fragment triple 310 to produce a blended fragment triple 530, and the pointers 322, 324 linking subpixels S2–S3 to the fragment triple 310 now point to the blended fragment triple 530. Also, fragment triple 410 is blended with fragment triple 312 to produce a blended fragment triple 532, and the pointer 326 linking subpixel S1 to fragment triple 312 now points to the blended fragment triple 532. Subpixel S4 is linked to the blended fragment triple 530. Alternatively, the subpixel S4 can be linked to the other fragment triple 532.

The blended fragment triples 530, 532 are stored in the pixel memory 314. The blended fragment triple 530 occupies the memory addresses previously occupied by the fragment triple 310. The addresses of pixel memory 314 that previously stored the fragment triple 312, now stores the blended fragment triple 532.

Figure 5C:
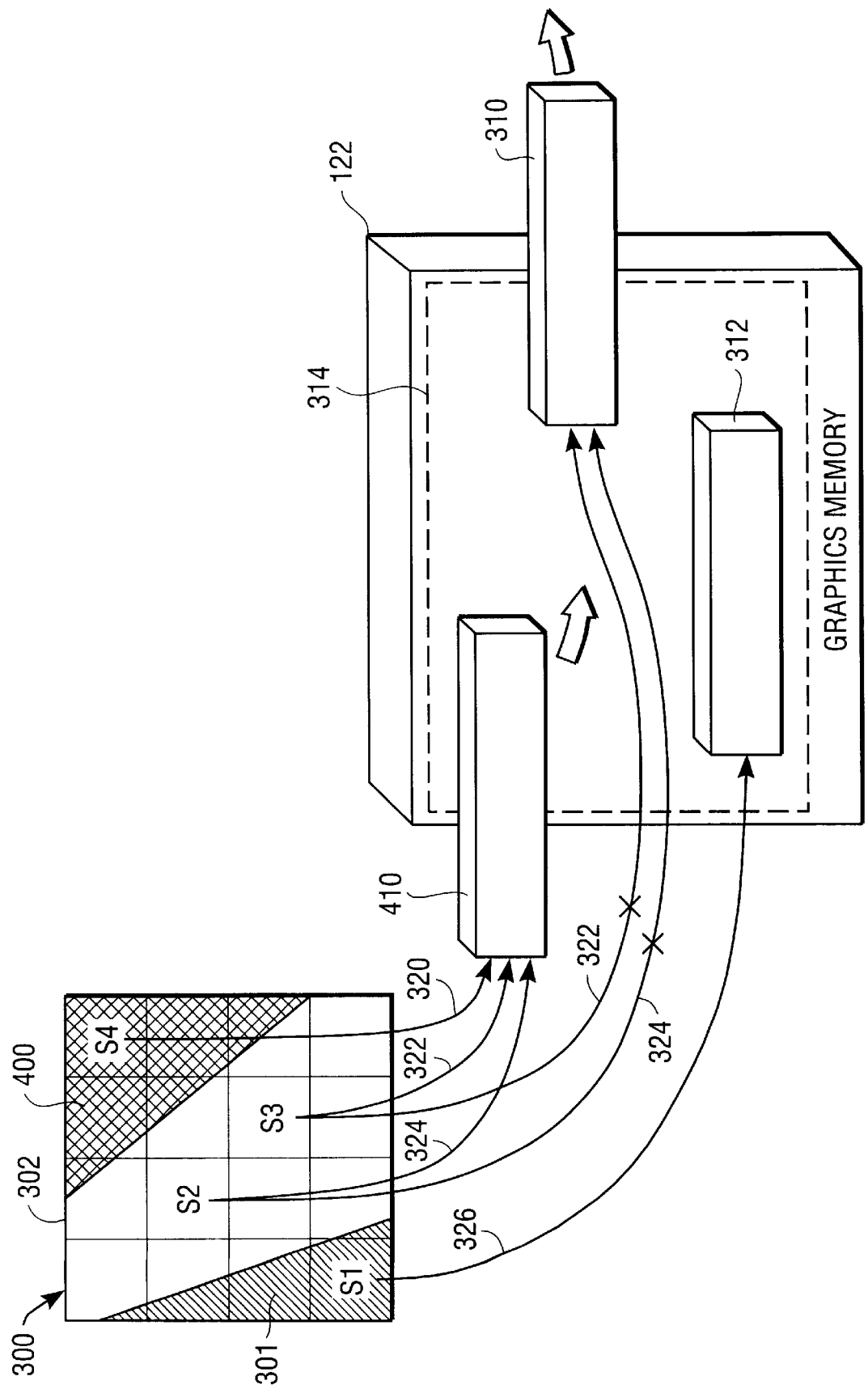

FIG. 5C shows an exemplary approach for accommodating the third visible fragment 400 in the pixel 300. This approach replaces one of the fragment triples 310, 312 previously stored in the pixel memory 314 with the third fragment triple 410. For example, the fragment triple 310 is replaced by the new fragment triple 410. To execute this replacement the graphics accelerator 108 would write the data of the new fragment triple 410 over the data of the previously stored fragment triple 310, in effect, discarding the data of fragment triple 310. Alternatively, memory can be deallocated for the fragment triple 310, and allocated for fragment triple 410.

In FIG. 5C, the data of the new fragment triple 410 occupies the particular addresses of pixel memory 314 that previously stored the fragment triple 310. The pointers 322, 324 point to these particular addresses of pixel memory. Where previously the pointers 322, 324 linked the subpixels S2–S3 to the fragment triple 310, these pointers 322, 324 now link the subpixels S2–S3 to the new fragment triple 410.

Techniques for selecting which fragment triples 310, 312, or 410 is discarded are described below.

Selection Schemes

Z-Priority

One technique for selecting the fragment triple 310, 312 to replace, called the Z-priority method, is to determine which fragment triple 310, 312 stored in the pixel memory 314 has the largest Z-depth value 306. From the perspective of a viewer, the greater the Z-depth value 306, the farther is the corresponding fragment from the viewer. For example, if the Z-depth value 306 of the fragment triple 310 is 4 and the Z-depth value 306 of the fragment triple 312 is 2, then fragment triple 310 is replaced by the new fragment triple 410. The pointers 322–324 that previously linked subpixel samples S2–S3 to the fragment triple 310 now link the subpixel samples to the fragment triple 410. In the event that more than one stored fragment triple 310, 312 has the largest Z-depth value 306, the fragment triple 310, 312 with the fewer pointers 320–326 can be replaced.

Basic Color Difference

Another technique for selecting which fragment triple 310, 312 to replace, called the basic color difference method, involves determining which fragment triple 310, 312 stored in the pixel memory 314 has a color value 304 that is most like the color value 304 of the new fragment triple 410 i.e., produces the smallest color difference. The color value 304 of the new fragment triple 410 is compared with the color value 304 of each stored fragment triple 310, 312. Although described below using the RGB color model, this method can be applied to other color models, such as the Hue, Lightness and Saturation (HLS) and the Hue, Saturation and Value (HSV) color models.

More specifically, the basic color difference method compares the 10-bit value for the RED channel of the new fragment triple 410 with the 10-bit value for the RED channel of each stored fragment triple 310, 312. Comparisons are also made for the GREEN and BLUE channels. Values in the Alpha channels are not compared.

The absolute values of the differences between the values of the channels of the new fragment triple 410 and the values of the channels of the stored fragment triples 310, 312 are summed. Then, the sum is multiplied by the number of subpixel samples that point to the stored fragment triple 310, 312. This produces a total color difference that would result if that stored fragment triple 310, 312 were replaced by the new fragment triple 410. The fragment triple 310, 312 that produces the smaller color difference is replaced by the new fragment triple 410.

Using an overly simplified example with reference to FIG. 5C, the fragment triple 310 has a RED value of 0, GREEN value of 2, and a BLUE value of 4; the fragment triple 312 has a RED value of 2, a GREEN value of 4, and a BLUE value of 0; and the new fragment triple 410 has a RED value of 0, a GREEN value of 3, and a BLUE value of 3. Also, as shown in FIG. 5C, there are two subpixels pointing to the fragment triple 310—when the new fragment 400 is determined to be visible at sample point S4, the pointer 320 (see FIG. 3) from S4 to fragment triple 310 is invalidated—and one subpixel pointing to the fragment triple 312.

The total color difference between fragment triple 310 and new fragment triple 410 is 4, e.g., (|0−0|+|2−3|+|4−3|)*2, and the total color difference between fragment triple 312 and new fragment triple 410 is 6, e.g., (|2−0|+|4−3|+|0−3|)*1.

Thus, the fragment triple 310 is therefore replaced.

Color Difference and Transparent Fragments

When transparent fragments are involved in color difference, the impact of each possible replacement upon the final pixel color is compared to the ideal final pixel color that would result if the new fragment triple 410 could be stored in the pixel memory 314. That stored fragment triple 310, 312, which produces a final pixel color with the smallest color difference when compared to the ideal final pixel color, is selected for replacement. In a stack of transparent fragments, this selection tends to replace the more distant transparent fragments that are hard to see.

N-Squared Color Difference

In addition to comparing the new fragment triple 410 with each stored fragment triple 310, 312, as is done in the color difference method, the N-squared color difference method compares each stored fragment triple 310, 312 against each other. This method either replaces one of the stored fragment triples 310 with the new fragment triple 410, or replaces one of the stored fragment triples 310, 312 with another of the stored fragment triples 310, 312, i.e., by changing the pointers from the one stored fragment triple to that other stored fragment triple. The new fragment triple 410 is written at the addresses of pixel memory where the replaced fragment triple was previously stored. The N-squared color difference does not appear to perform significantly better than the color difference process.

Visual Sensitivity Color Difference Methods

Other techniques that may yield satisfactory results rely on the characteristics of the human visual system. For example, the ability of a human eye to distinguish changes in brightness may be less than the ability to perceive changes in hue. Accordingly, an exemplary visual sensitivity replacement scheme can capitalize on this characteristic by replacing the fragment triple 310, 312 that is brighter or dimmer than the new fragment triple 410 instead of the fragment triple 310, 312 that has a different hue. Such a method would prefer to replace the stored fragment triple 310, 312 with a color value 304 that differs equally, or almost equally, in each of the RGB color channels from the color value 304 of the new fragment triple 410.

Another exemplary technique can rely on the logarithmic behavior of luminance perception in humans. In general, a human eye can detect, approximately, a 2% change in the brightness of a color. Consequently, large numerical differences between high color values 304 (i.e., colors of high intensity) can be less noticeable than small numerical differences between low color values (i.e., colors of low intensity). So luminance differences are computed as ratios of color values 304, rather than as numerical differences between color values. The fragment triple 310, 312 that produces the lower luminance differences, i.e., the smaller ratio of colors, when compared to the new fragment triple 410 is replaced.

Z-Priority Color Difference

This technique combines the Z-priority method with any of the above mentioned color difference methods to produce a replacement scheme that can perform better than any of the methods alone. The above-described color difference methods operate to replace a stored fragment triple with the new fragment triple. The Z-priority Color Difference method considers additionally whether one of the stored fragment triples 310, 312 should instead replace the new fragment triple 410.

Here, the method computes color differences between the new fragment triple 410 and each stored fragment triple 310, 312 that may replace the new fragment triple 410. These color differences are computed for each of those stored fragment triples that are in front of the new fragment, i.e., lower Z-depth value, but not for those stored fragment triples that are behind the new fragment.

Accordingly, a stored fragment triple 310, 312 may be selected to replace the new fragment triple 410 when that fragment triple 310, 312 produces the smallest color difference and that fragment triple 310, 312 is associated with a fragment that is in front of the new fragment. In this case, replacement means that each subpixel sample covered by the new fragment are linked to the selected stored fragment triple 310, 312 and the new fragment triple 410 is discarded.

In general, if more than one replacement is possible, then the replacement affecting the fewer number of subpixel samples should occur. For example, if either the new fragment triple or a stored foreground fragment triple can be replaced, then the stored fragment triple replaces the new fragment triple if the stored foreground triple covers more subpixel samples than the new fragment triple.

Area Coverage

Another effective process selects the fragment triple that is visible at the fewest number of subpixel samples, and replaces that fragment triple with the new fragment triple 410. Afterwards, each pointer to the replaced fragment triple points to the new fragment triple.

Semaphore Process

The Z-priority Color Difference method allows existing foreground fragments to replace new background fragments, but does not allow existing background fragments to replace new foreground fragments. This is done to avoid losing large foreground surfaces that are made up of small foreground fragments—the large surface could be lost if the process allowed each of the small foreground fragments to be replaced by a larger background fragment. The Semaphore Process also avoids this problem.

The Semaphore Process associates a semaphore bit with each pixel. Initially, each semaphore bit is set to 0. If it is determined that replacing a new foreground fragment with an existing background fragment produces a smallest color difference, and the associated semaphore bit is 0, then the semaphore process allows the existing background fragment to replace the new foreground fragment. The associated semaphore bit is set to 1. This ensures that two such replacements cannot occur consecutively. If the replaced new foreground fragment was part of a larger foreground surface, then the next new foreground fragment for that larger surface will replace the existing background fragment because the semaphore bit is a 1. However, it was observed that this basic semaphore process can produce some unsatisfactory artifacts.

Fragment Centroid Distance Methods

Such methods base color replacement on the distance between the new fragment and each possible fragment that the new fragment can replace. Accordingly, a new fragment can be extended to cover adjacent subpixel samples rather than replace stored fragments that cover distant subpixel samples. Further, it is likely that subpixel samples near the covered subpixel samples will later become covered.

Figure 6B:
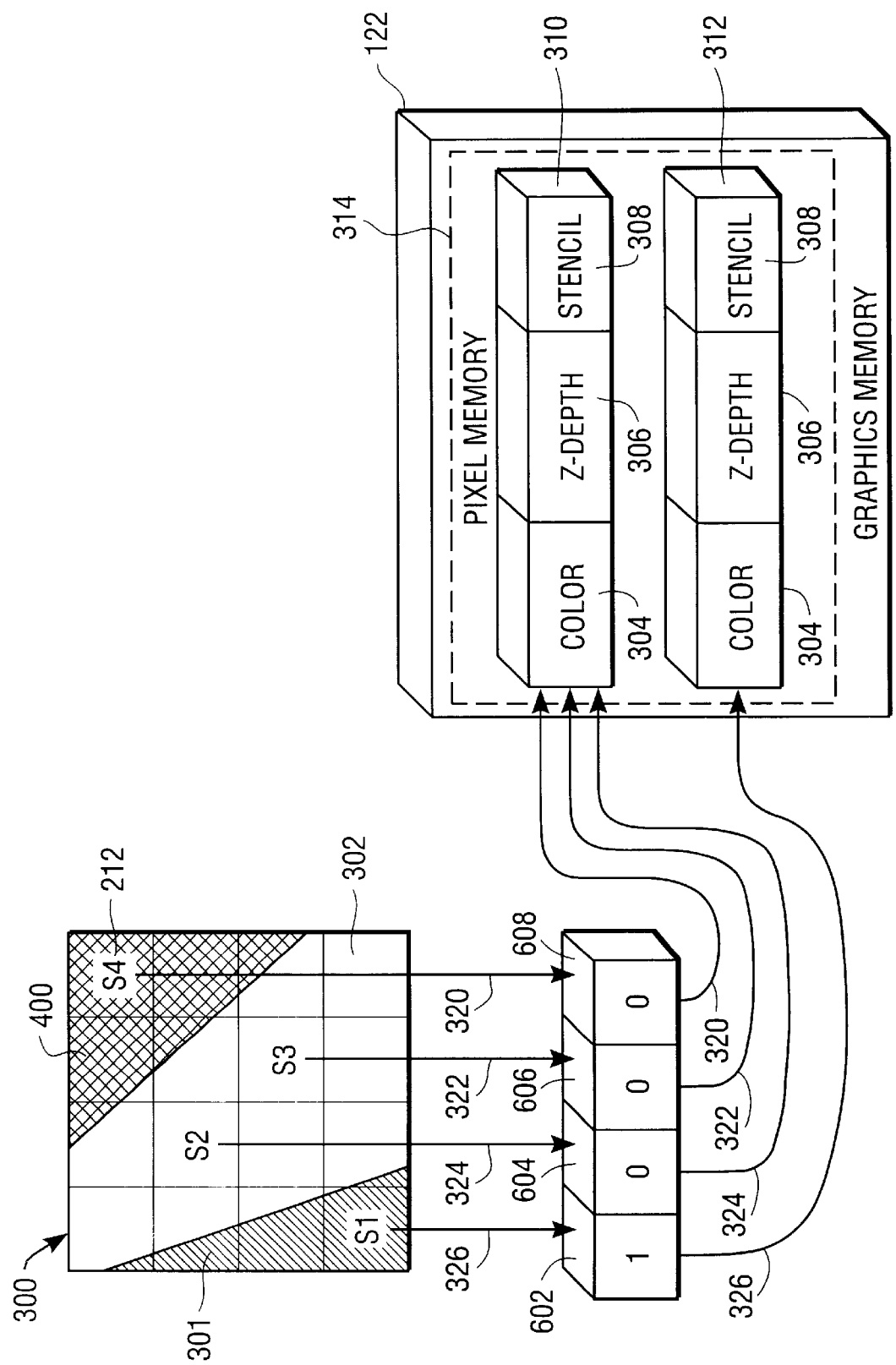

FIGS. 6A and 6B illustrate a exemplary logical representation of the pixel memory 314 used by the indexed sparse supersampling technique. The pixel memory 314 includes indices 600 and fragment triples 310, 312. The pixel memory 314 provides storage for a predetermined number of fragment triples. Although shown to be contiguous in the graphics memory 122, the indices 600 can be separate from each other or from the fragment triples 310, 312.

The indices 600 indicate where in the pixel memory 314 the fragment triple associated with each subpixel sample can be found. Each index 602–608 of the indices 600 is associated with one of the subpixel samples S1–S4. For example, as shown in FIG. 6B, index 602 is associated with subpixel sample S1, index 604 is associated with subpixel sample S2, and so forth. For the sampling pattern 220, there are eight indices for the eight subpixel samples S1–S8, and for sampling pattern 230, where N=16, there are sixteen.

The value stored in each index 602–608 points to one of the fragment triples 310, 312. Accordingly, each index 602–608 links the associated subpixel sample S1–S4 to one of the fragment triples 310, 312.

When two fragment triples 310, 312 are stored in the pixel memory 314, then each index 602–608 can be represented by one data bit. The bit value stored in each index 602–608 directs the graphics accelerator 108 to the fragment triple 310, 312 associated with each subpixel sample S1–S4. In the example shown in FIG. 6B, a "1" is stored in index 602, and a "0" in each of the other indices 604–608. A zero bit value points to the first fragment triple 310 in the pixel memory 314, and a one bit value points to the second fragment triple 312.

If, alternatively, there are three fragment triples stored in the pixel memory 314, then two bits per index 602–608 are needed. Two bits per index 602–608 can accommodate as many as four stored fragment triples, three bits, as many as eight triples, and four bits, as many as sixteen.

With one bit per index 602–608, the sampling pattern 210 (N=4) needs four bits of pixel memory 314 to implement the indices 600. The storage requirements for indices 600 of larger sampling patterns 220, 230 is also small. For example, the sampling pattern 230 (N=16) would need 16 bits per pixel 134 to implement one bit per index. Implementing four bits per index uses 64 bits per pixel, which still provides a sizable storage savings over typical sparse supersampling techniques that store sixteen fragment triples for the sixteen subpixels samples S1–S16.

To compute a color for the pixel 300, the color value 304 of each stored fragment triple 310, 312 is multiplied by the percentage of subpixel samples linked by an index to that fragment triple. Then these weighted color values are added together to produce the pixel color.

Figure 6C:
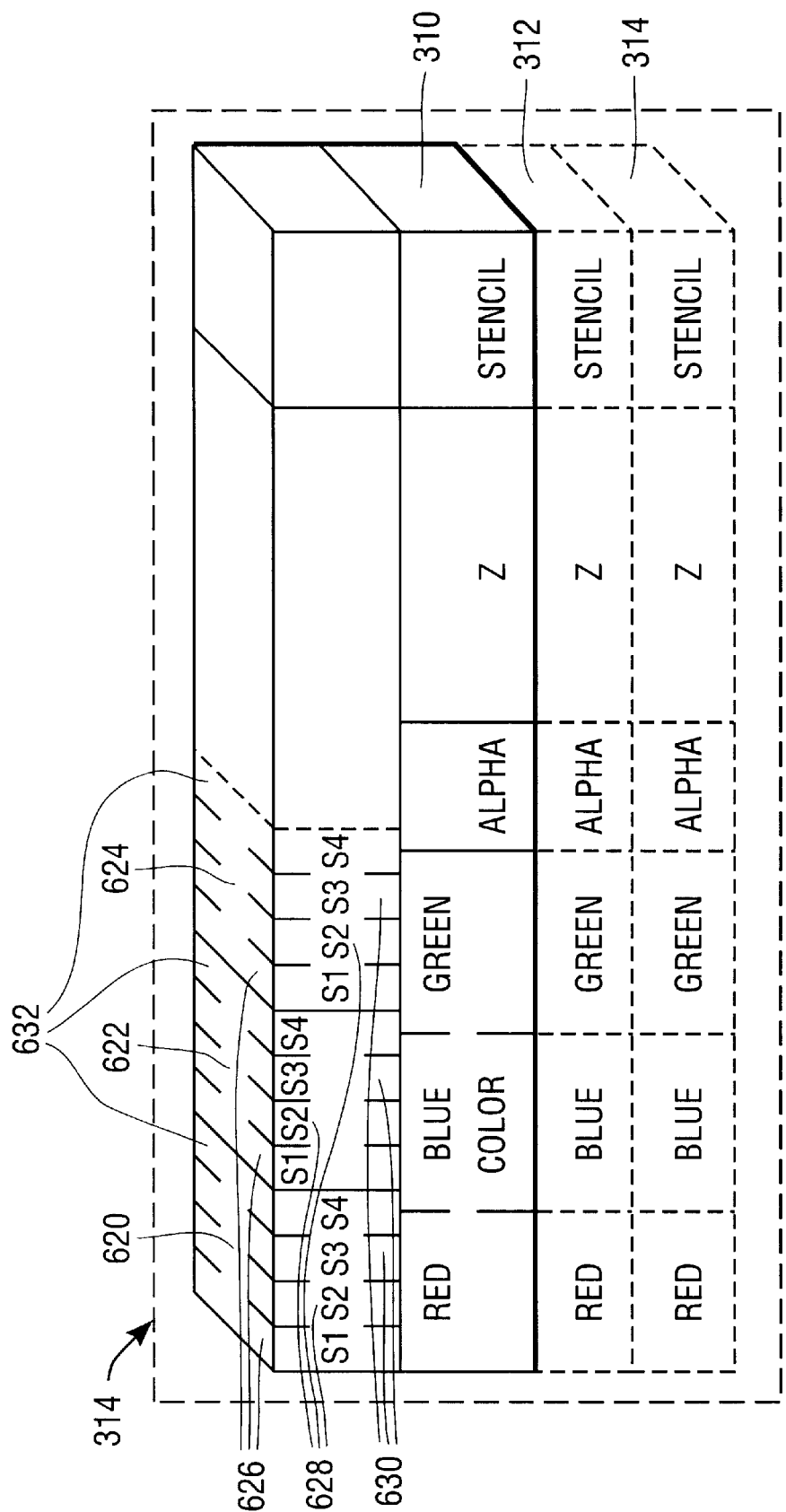
FIGS. 6C–6D illustrate a logical representation of the pixel memory including coverage masks associated with the stored fragment triples.
Figure 6D:
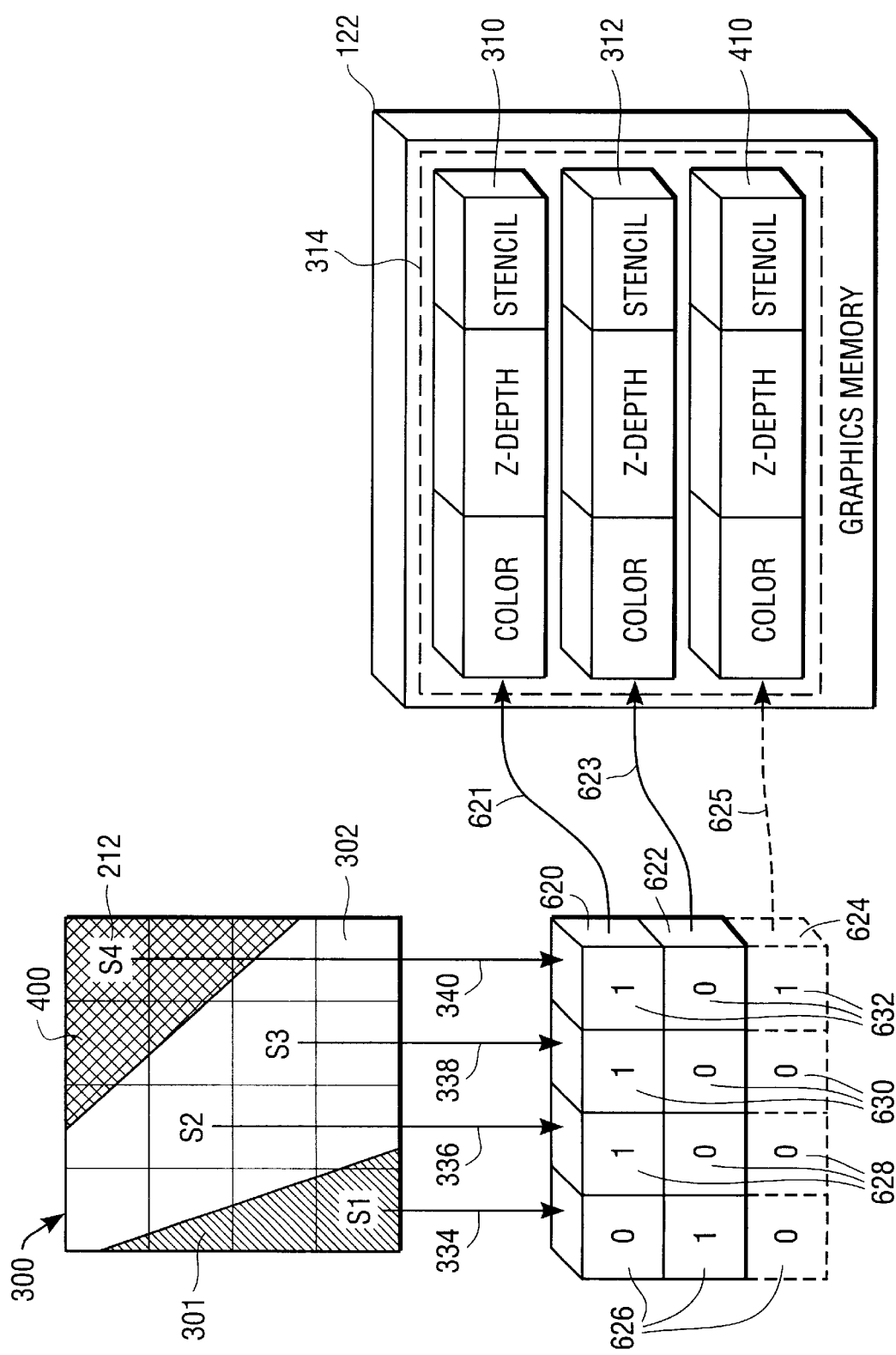

FIGS. 6C and 6D illustrate an exemplary logical representation of the pixel memory 314 used by the improved A-buffer technique. The pixel memory 314 includes coverage masks (or bit patterns) 620, 622 and stored fragment triples 310, 312. The pixel memory 314 provides storage for a predetermined number of fragment triples. Although shown to be contiguous in the graphics memory 122, the coverage masks 620, 622 can be separate from each other or from the fragment triples 310, 312. An alternative embodiment, including a third coverage mask 624 and the third stored fragment triple 410, is illustrated in FIGS. 6C and 6D with dashed lines.

The coverage masks 620, 622 link the subpixel samples S1–S4 to the fragment triples 310, 312 stored in the pixel memory 314. There is one coverage mask 620, 622 associated with each stored fragment triple 310, 312. Referring to FIG. 6D, the coverage mask 620 is associated with fragment triple 310, for example, as indicated by arrow 621, and the coverage mask 622 is associated with fragment triple 312 as indicated by arrow 623. In the illustrated alternative embodiment, the coverage mask 624 is associated with the third fragment triple 410 by arrow 625.

Each coverage mask 620, 622, 624 includes one bit for each subpixel sample S1–S4. In FIG. 6D, the associations between the bits in the coverage masks and the subpixel samples S1–S4 are represented by arrows 634–640. For example, subpixel sample S1 is associated with bits 626, subpixel sample S2 with bits 628, sample S3 with bits 630 and sample S4 with bits 632.

With one bit per sample S1–S4, the sampling pattern 210 (N=4) needs four bits 626, 628, 630, 632 of pixel memory 314 to implement each coverage mask 620, 622, 624. In the shown alternative embodiment, in which three fragment triples are stored, the combined requirement for the three associated coverage masks 620, 622, 624 is twelve bits.

For the sampling pattern 220, each coverage mask 620, 622, 624 requires eight bits, one for each of the eight subpixel samples S1–S8. As for the sampling pattern 230, which has sixteen subpixel samples S1–S16, there would be sixteen such bits in each coverage mask. Yet even with 16 bits per coverage mask, the storage savings are sizable over known sparse supersampling techniques that store sixteen fragment triples for the sixteen subpixels samples S1–S16.

The value stored in each bit of a given coverage mask indicates whether the subpixel sample associated with that bit is linked to the fragment triple associated with the given coverage mask. When a sample is linked to a fragment triple, this means that the fragment associated with that fragment triple is visible at that sample.

In the example shown in FIG. 6D, a bit pattern "0 1 1 1" is stored in the coverage mask 620. The "1" value in bits 628, 630 and 632 of the coverage mask 620 link the subpixel samples S2–S4 to the stored fragment triple 310, indicating that the fragment 302 is visible at those sample points S2–S4. Conversely, the "0" value in bit 626 of the coverage mask 620 indicates that the fragment 302 is not visible at the subpixel sample S1. Clearly, the role of each bit value can be reversed so that the "1" bit value indicates that the fragment is not visible at a given sample point, and that the "0" bit value indicates that the fragment is visible.

In the alternative embodiment shown in FIG. 6D, a third coverage mask 624 links the subpixel sample S4 to the third fragment triple 410 stored in the pixel memory 314. The association between the third coverage mask 624 and the third fragment triple 410 is noted by arrow 625.

The exemplary bit pattern stored in coverage mask 624 is "0 0 0 1", indicating that the third fragment 400 is visible at sample S4 only. Recall from FIG. 4 that new fragment 400 is linked to the fragment triple 410. For the purposes of the following illustration example, the third fragment 400 is treated as transparent. (Note that if the third fragment 400 was opaque, as described in connection with FIG. 4, then the bit pattern in the coverage mask 620 would change from "0 1 1 1" to "0 1 1 0" to indicate that the fragment 400 occluded the fragment 302 at the subpixel sample S4.)

Because the third fragment 400 is transparent, two coverage masks 620, 624 link the subpixel sample S4 to two stored fragment triples 310, 410. The "1" bit values in bit positions 632 of the coverage mask 620 and 624 indicate that both fragments 302 and 400 are visible at the subpixel sample S4. Generally, any subpixel sample S1–S4 can be linked to multiple stored fragment triples, where one fragment is opaque and each other fragment is transparent. In fact, all of stored fragment values can be transparent when a default background fragment value is used.

Accordingly, the improved A-buffer technique of the present invention can support order-independent transparency, i.e., the system 100 does not need to partition primitives of the image 132 so as to present transparent fragments to the graphics accelerator 108 after presenting all opaque fragments, nor does the system 100 need to sort the transparent primitives so as to present transparent fragments in Z-depth order.

To compute the color of the pixel 300, a color is first computed for each subpixel sample S1–S4, and then the computed colors are combined. Where a subpixel sample is linked to one opaque fragment only, such as sample S1, the color for that subpixel sample S1 is the color of the associated stored fragment value 312.

Where a subpixel sample, such as sample S4, is linked to two stored fragment triples 310, 410, one transparent 400 and the other opaque 302, the color for the subpixel sample S4 is the sum of the color contributions of those two fragment triples 310, 410. The color contribution of the transparent fragment 400 is the opacity of that fragment 400, as indicated by the value stored in the Alpha channel, multiplied by the color of that fragment 400. The contribution C of the opaque fragment 302 is the color of that fragment f(c) 302 multiplied by 1 minus the opacity of the transparent fragment f(o). 400, e.g., $C = f(c) \times (1 - f(o))$.

The exemplary embodiments shown in FIGS. 6A–6D can achieve satisfactory antialiasing results by storing two fragment triples for four subpixel samples. Eight subpixel samples with two stored fragment triples usually looks better than four subpixel samples with two fragment triples, but can look worse when one of the additional four subpixel samples requires replacing one of the stored triples with a third fragment triple, and that third fragment triple appears in the pixel memory last. Thus, allocating storage for a third fragment triple can make a marked improvement for eight subpixel samples over storing two fragment triples. Clearly, the antialiasing results can be made to approach the results of typical sparse supersampling as more fragment triples are stored, but each additional triple erodes the memory savings provided by the improved supersampling techniques.

Figure 7:
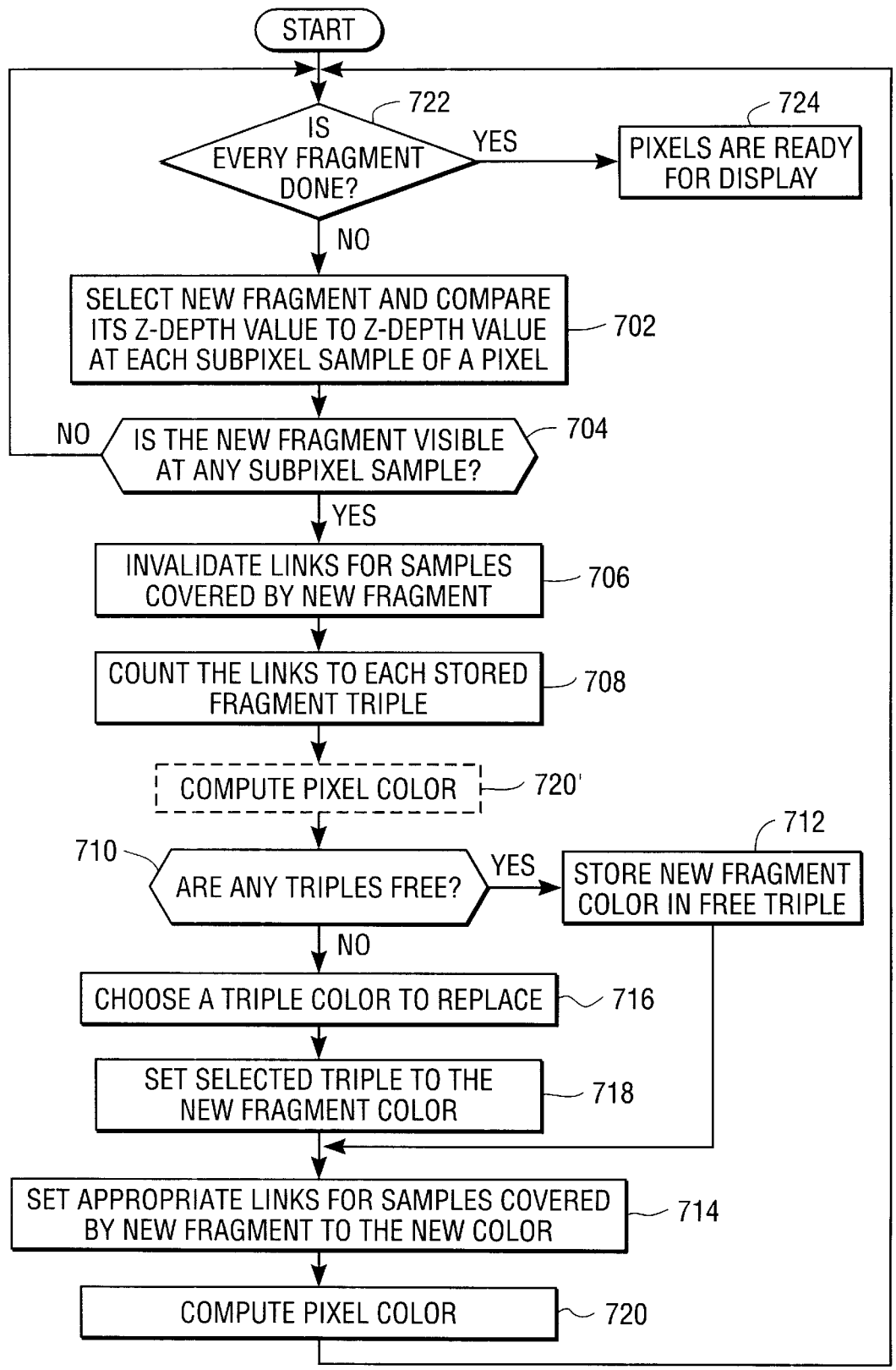
FIG. 7 illustrates a flow diagram describing a process using the present invention.

FIG. 7 illustrates a flow diagram 700 describing the process of generating an image 132 using the present invention. In the early stages of processing the image 132, the image 132 is partitioned into fragments. When processing each new fragment, the graphics accelerator 108 determines whether the new fragment is visible at any of the subpixel samples S1–S4 covered by the new fragment. The graphics accelerator 108 compares the Z-depth value of the new fragment with the Z-depth value of the stored fragment associated with each covered subpixel sample S1–S4 (step 702).

If the new fragment has a smaller Z-depth value than the Z-depth value of a stored fragment for any covered subpixel sample S1–S4, then the new fragment is in front of that stored fragment and, consequently, is visible. An exception, however, is when the new fragment has an Alpha value of 0.0. In this instance the new fragment is completely transparent. The graphics accelerator 108 does not need to store the fragment value of the new fragment because the new fragment is, in effect, invisible.

If instead the new fragment has a larger Z-depth value than the Z-depths values for all of the covered subpixel samples S1–S4, then the new fragment is behind one or more stored fragments and may be invisible. If the new fragment is behind opaque foreground fragments, then the new fragment is invisible, and the processing of the new fragment for the pixel 134 is complete. If, however, the new fragment is immediately behind a transparent foreground fragment, then the new fragment can still be seen.

When the new fragment is visible at one of the covered subpixel samples, then the graphics accelerator 108 invalidates the link between each covered sample and a stored fragment, if the new fragment obscures the stored fragment for that covered subpixel sample. For the indexed sparse supersampling technique, the graphics accelerator 108 maintains control bits for keeping track of the validity of each index and invalidates each index linking a covered subpixel sample to an obscured fragment. The control bits may direct the graphics accelerator 108 to use the default background color if no fragments cover a subpixel sample. For the improved A-buffer technique, the bits in the coverage mask associated with each covered subpixel sample are unchanged when the new fragment is transparent and are set to "0" when the new fragment is opaque.

Then, in step 708, the number of links pointing to each fragment triple is counted. For the indexed sparse supersampling technique, step 708 counts the number of indices linked to that stored fragment triple. For the improved A-buffer technique, step 708 counts the number of bits in each coverage mask that have a "1" bit value.

A fragment triple is free and available when there are no links pointing to the fragment triple. In this case a new fragment triple associated with the new fragment can replace that free fragment triple.

If step 710 determines that a fragment triple is free, then the new color associated with the new fragment is stored in the freed fragment triple (step 712). In step 714, the links of the subpixel samples covered by the new fragment are set to the new fragment triple.

If step 710 determines that no fragment triples are free, then a replacement scheme, such as the color difference technique described above, selects one of the stored fragment triples for replacement (step 716). Replacement means changing the color, Z-depth, and stencil values stored in the selected fragment triple to the color, Z-depth, and stencil values of the new fragment triple.

In step 718, the new color is written to the selected fragment triple. The links originally pointing to the selected fragment triple are still pointing to that fragment triple. Because the selected fragment triple now contains a value representing the new color, the subpixel samples associated with such links are thereby associated with the new color. Those links corresponding to the subpixel samples covered by the new fragment are set to point to the new color (step 714).

In step 720, the pixel color is computed from the subpixel samples as described above in connection with FIGS. 6A–6D. The links associated with the subpixel samples S1–S4 point to the stored colors that are used to produce the color of the pixel 134. Accordingly, the pixel color can change as each new fragment appears in the pixel 134.

When, in step 722, the graphics accelerator 108 is through processing all fragments, then the pixels are ready for display (step 724).

In FIG. 7, an alternative process for generating an image computes the color of the pixel in step 720', illustrated as dashed lines, before determining whether there are any fragment triples available in which to store the new fragment value associated with the new fragment. The existing colors stored in the fragment triples and the new color value combine to produce the pixel color. The effect is to compute the color as though an additional triple was available.

After computing the pixel color in step 720', the alternative process may then replace an existing stored color with the new fragment triple as described above in connection with the steps 716–718. If each fragment processed after this new fragment does not lead to a new computation of the pixel color, then no color data is lost despite the replacement.

It is to be understood that the above-described embodiments are simply illustrative of the principles of the invention. Various other modifications and changes may be made by those skilled in the art which will embody the principles of the invention and fall within the spirit and the scope thereof.

What is claimed is:

1. A computerized method for determining a color of a pixel of an image, the pixel being associated with a set of subpixel samples, the set of subpixel samples having a plurality of subpixel samples, the set of subpixel samples having a number of subpixel samples, comprising:

storing a plurality of distinct fragment values for the pixel up to a predetermined maximum number of distinct fragment values, each stored fragment value being associated with at least one subpixel sample, each stored fragment value being associated with a fragment that is visible in the pixel, the predetermined maximum number of fragment values being less than the number of subpixel samples;

determining that a new fragment is visible in the pixel with at least one other fragment with a stored fragment value still being visible in the pixel, the new fragment having a new fragment value;

selecting one of the visible stored fragment values; and replacing the selected fragment value with the new fragment value wherein the stored fragment values are subsequently used to generate the color of the pixel.

2. The method of claim 1 wherein the new fragment has a new fragment depth value and the stored fragments have stored fragment depth values, further comprising discarding the fragment value of the new fragment when the new fragment depth value is greater than the stored fragment depth values.

3. The method of claim 1 wherein the replacing includes writing the new fragment value over one of the stored fragment values.

4. The method of claim 1 wherein the new fragment is part of a different surface of the image than each of the fragments associated with a stored fragment value.

5. The method of claim 1 further comprising:

generating the color of the pixel using the new fragment value and each stored fragment value before replacing the fragment value of a stored visible fragment.

6. The method of claim 1 wherein each stored fragment value includes a Z-depth value, and the selecting selects the stored fragment value with the Z-depth value that is larger than the Z-depth value of each other stored fragment value; and the replacing replaces the selected stored fragment value with the new fragment value.

7. The method of claim 1 wherein the selecting selects the stored fragment value that, if replaced by the new fragment value, would produce a less visually detectable color difference than would be produced for each other stored fragment value if that other stored fragment value were replaced by the new fragment value; and the replacing replaces the selected stored fragment value with the new fragment value.

8. The method of claim 1 further comprising:

determining an area of the pixel covered by each fragment for which that fragment is visible;

wherein the selecting selects the fragment value of the fragment with a smaller area of visible coverage than each other fragment.

9. The method of claim 1 wherein the selecting selects the stored fragment value of the fragment that is spatially closer to the new fragment than each other fragment; and the replacing replaces the selected stored fragment value with the new fragment value.

10. The method of claim 1, wherein at least one of the fragments that are visible in the pixel is transparent.

11. The method of claim 1, wherein each fragment value includes a color value, and further comprising:

comparing the color value of the new fragment value with the color value of each stored fragment value, wherein the selecting selects the one stored fragment based on a result from the comparing.

12. The method of claim 11 wherein each fragment value includes a Z-depth value, and wherein the selecting selects the new fragment value when one of the stored fragment values has a lower Z-depth value than the Z-depth value of the new fragment value and the color value of that stored fragment value produces a numerically smaller color difference when compared to the color value of the new fragment value than each other color difference between two fragment values; and the replacing replaces the new fragment value with that stored fragment value.

13. The method of claim 11, wherein the color value include color channels, the comparing determines total color differences between the new fragment value and the stored fragment values, each total color difference being determined by summing a color difference for each color channel of the new fragment value and one of the stored fragment values to generate a sum, and multiplying the sum by the number of subpixel samples associated with the stored fragment to generate the total color difference, the selecting selects the stored fragment value with the color value that produces a numerically smaller total color difference than other total color differences; and replacing the selected stored fragment value with the new fragment value.

14. The method of claim 11 wherein the comparing includes comparing the color value of each stored fragment value with the color value of each other stored fragment value, and the selecting selects the one stored fragment based on a result from the comparing.

15. The method of claim 14, wherein the color value includes color channels, the comparing determines total color differences between the new fragment value and the stored fragment values, each total color difference being determined by summing a color difference for each color channel of the new fragment value and one of the stored fragment values to generate a sum, and multiplying the sum by the number of subpixel samples associated with the stored fragment to generate the total color difference, the selecting selects the stored fragment value with the color value that produces a numerically smallest total color difference than the other total color differences.

16. The method of claim 15 wherein the replacing replaces the selected stored fragment value with the new fragment value.

17. A computerized method for determining a color of a pixel of an image, comprising:

storing up to a predetermined number of fragment values, each stored fragment value being associated with a fragment that is visible in the pixel, each fragment value including a color value, wherein the color value of each fragment value includes a plurality of color channel values;

determining that a new fragment is visible in the pixel with at least one other fragment with a stored fragment value still being visible in the pixel, the new fragment having a new fragment value;

comparing the color value of the new fragment value with the color value of each stored fragment value including:

determining a color difference between the color value of the new fragment value and the color value of a particular one of the stored fragment values by:

computing, for each channel value, an absolute value difference between each color channel value of the new color value and a corresponding color channel value of the color value of particular stored fragment value; and summing the absolute value differences computed for each color channel value; and selecting the stored fragment value with the color value that produces a numerically smaller color difference than the color value of each other stored fragment value when compared to the color value of the new fragment; and replacing the selected fragment value with the new fragment value to determine which fragment values are stored and subsequently used to generate the color of the pixel.

18. The method of claim 17 further comprising:

multiplying the sum of the absolute value differences by an area of the pixel covered by the fragment associated with the particular stored fragment value.

19. A computerized method for determining a color of a pixel of an image, comprising:

storing up to a predetermined number of fragment values, each stored fragment value being associated with a fragment that is visible in the pixel;

determining that a new fragment is visible in the pixel with at least one other fragment with a stored fragment value still being visible in the pixel, the new fragment having a new fragment value;

associating a semaphore bit with the pixel;

initially setting the semaphore bit to a predetermined value;

selecting the new fragment value when the semaphore bit is set to the predetermined value, the color value of a particular stored fragment value produces a numerically smaller color difference when compared to the color value of the new fragment value than each other color difference between two fragment values, and the new fragment value has a Z-depth value that is less than or equal to a Z-depth value of the particular stored fragment value;

discarding the selected fragment value to determine which fragment values are stored and subsequently used to generate the color of the pixel; and setting the semaphore bit to a second predetermined value when the new fragment value is selected.

20. The method of claim 19 further comprising:

selecting one of the stored fragments when the semaphore bit is set to the second predetermined value, the color value of that stored fragment value produces a numerically smaller color difference when compared to the color value of a subsequent new fragment value than each other color difference between two fragment values, and the subsequent new fragment value has a Z-depth value that is less than or equal to a Z-depth value of that stored fragment value; and replacing the selected stored fragment value with the new fragment value.

21. A computerized method for determining a color of a pixel of an image, the pixel being associated with a set of subpixel samples, the set of subpixel samples having a plurality of subpixel samples, the set of subpixel samples having a number of subpixel samples, comprising:

associating a set of fragment values with the pixel, each fragment value in the set corresponding to a fragment that is visible when the pixel is rendered, each fragment value in the set of fragment values being distinct, the set of fragment values having up to a predetermined maximum number of distinct fragment values, each fragment value being associated with at least one subpixel sample, each fragment value being visible in the pixel, the predetermined maximum number of fragment values being less than the number of subpixel samples;

storing the set of the associated fragment values; and using the fragment values of the set to generate the color of the pixel.

22. An apparatus for determining a color of a pixel, the pixel being associated with a set of subpixel samples, the set of subpixel samples having a plurality of subpixel samples, the set of subpixel samples having a number of subpixel samples, comprising:

means for storing a plurality of distinct fragment values for the pixel up to a predetermined maximum number of distinct fragment values, each stored fragment value being associated with at least one subpixel sample, each stored fragment value being associated with a fragment of an image that is visible in the pixel, the predetermined maximum number of fragment values being less than the number of subpixel samples;

means for determining that a new fragment is visible in the pixel with at least one other fragment with a stored fragment value still being visible in the pixel, the new fragment having a new fragment value;

means for selecting one of the visible stored fragment values; and means for replacing the selected fragment value with the new fragment value wherein the stored fragment values are subsequently used to generate the color of the pixel.

23. An apparatus for determining a color of a pixel, the pixel being associated with a set of subpixel samples, the set of subpixel samples having a plurality of subpixel samples, the set of subpixel samples having a number of subpixel samples, comprising:

memory storing a plurality of distinct fragment values for the pixel up to a predetermined number of distinct fragment values for the pixel, each stored fragment value being associated with at least one subpixel sample, each stored fragment value being associated with a fragment of an image that is visible in the pixel, the predetermined maximum number of fragment values being less than the number of subpixel samples; and a graphics device coupled to the memory, the graphics device determining that a new fragment is visible in the pixel with at least one other fragment with a stored fragment value still being visible in the pixel, the new fragment having a new fragment value, the graphics device selecting one of the visible stored fragment values; the graphics device replacing the selected fragment value with the new fragment value wherein the stored fragment values are subsequently used to generate the color of the pixel.

24. The apparatus of claim 23 wherein the graphics device replaces the fragment value of one of the stored visible fragments by writing the new fragment value over one of the stored fragment values.

25. The apparatus of claim 23 wherein each stored fragment value includes color channels, the comparing determines total color differences between the new fragment value and the stored fragment values by summing a color difference for each color channel of the new fragment value and one of the stored fragment values to generate a sum, and multiplying the sum by the number of subpixel samples associated with the stored fragment to generate the total color difference, and the graphics device compares the total color differences between the new fragment value and each stored fragment value, wherein the graphics device selects one of the stored fragment values based on the comparison of the total color differences.

26. An apparatus for determining a color of a pixel, comprising:

a memory storing up to a predetermined number of fragment values, each stored fragment value being associated with a fragment that is visible in the pixel, each fragment value including a color value, wherein the color value of each fragment value includes a plurality of color channel values; and a graphics device, coupled to the memory, that:

determines that a new fragment is visible in the pixel with at least one other fragment with a stored fragment value still being visible in the pixel, the new fragment having a new fragment value;

compares the color value of the new fragment value with the color value of each stored fragment value including:

determining a color difference between the color value of the new fragment value and the color value of a particular one of the stored fragment values by:

computing, for each channel value, an absolute value difference between each color channel value of the new color value and a corresponding color channel value of the color value of particular stored fragment value; and summing the absolute value differences computed for each color channel value; and selects the stored fragment value with the color value that produces a numerically smaller color difference than the color value of each other stored fragment value when compared to the color value of the new fragment; and replaces the fragment value of one of the visible fragments to determine which fragment values are stored and subsequently used to generate the color of the pixel by replacing the selected stored fragment value with the new fragment value.

27. The apparatus of claim 26 wherein the graphics device multiplies the sum of the absolute value differences by an area of the pixel covered by the fragment associated with the particular stored fragment value.

28. An apparatus for determining a color of a pixel, comprising:

a memory that stores up to a predetermined number of fragment values, each stored fragment value being associated with a fragment that is visible in the pixel; and a graphics device, coupled to the memory, that:

determines that a new fragment is visible in the pixel with at least one other fragment with a stored fragment value still being visible in the pixel, the new fragment having a new fragment value;

associates a semaphore bit with the pixel;

initially sets the semaphore bit to a predetermined value;

selects a new fragment value when the semaphore bit is set to the predetermined value, the color value of a particular stored fragment value produces a numerically smaller color difference when compared to the color value of the new fragment value than each other color difference between two fragment values, and the new fragment value has a Z-depth value of the particular stored fragment value;

discards the selected fragment value to determine which fragment values are stored and subsequently used to generate the color of the pixel; and sets the semaphore bit to a second predetermined value.

29. The apparatus of claim 28 wherein the graphics device selects a stored fragment when the semaphore bit is set to the second predetermined value, the color value of that stored fragment value produces a numerically smaller color difference when compared to the color value of a subsequent new fragment value than each other color difference between two fragment value, and the subsequent new fragment value has a Z-depth value that is less than or equal to a Z-depth value of that stored fragment value;

wherein the graphics device replaces the selected stored fragment value with the subsequent new fragment value.

\* \* \* \* \*